United States Patent [19]
Schneekloth

[11] 3,889,105
[45] June 10, 1975

[54] AUTOMATIC BACK UP OF A NUMERICAL CONTROL

[75] Inventor: Ulrich H. Schneekloth, Waynesboro, Va.

[73] Assignee: General Electric Company, Salem, Va.

[22] Filed: Aug. 20, 1974

[21] Appl. No.: 499,265

[52] U.S. Cl. ........... 235/151.11; 318/572; 318/568; 318/603; 318/608
[51] Int. Cl. ...................... G05b 19/36; G05b 19/18
[58] Field of Search ....... 235/151.11; 318/568, 572, 318/603

[56] References Cited
UNITED STATES PATENTS
3,523,230 8/1970 York................................. 318/603
3,802,622 4/1974 Nishimura et al. ............. 235/151.11

*Primary Examiner*—Eugene G. Botz
*Attorney, Agent, or Firm*—W. C. Bernkopf; J. H. Beusse

[57] ABSTRACT

A numerical contouring control capable of backing up along the path commanded by the block of data controlling the machine tool. When the control is in the backup mode of operation, the counting direction of the X and Y integrand counters of the contouring function generator and the direction control signals for the X and Y motion commands are reversed so that the machine tool reverses its direction along the commanded path. The counting direction of the X and Y distance counters is also reversed in the backup mode so that the X and Y distance counters continue to keep track of the X and Y distances from the present commanded position to the end point of the commanded path. The backup mode is manually terminated by the operator or is automatically terminated when the machine tool reaches the beginning of the commanded path. When the machine tool is returned to the normal mode of operation, the machine tool retraces and completes the commanded path.

3 Claims, 4 Drawing Figures

AUTOMATIC BACK UP OF A NUMERICAL CONTROL

BACKGROUND OF THE INVENTION

This invention relates to numerical contouring controls for a machine tool, and, more particularly, to a numerical contouring control in which the machine tool can be automatically backed up along the path commanded by the block of data controlling the machine tool.

When a numerical contouring control is used to control a machine tool, such as a flamecutter, and a flameout occurs, it is necessary to back up the flame cutter, restart the flame, and then continue the cutting program. This backup procedure involves positioning the flamecutter under manual control to a position called for at the start of a block of data, and backing the tape reader to the new starting block. The operator must take care that the flamecutter is positioned at the coordinates called for at the beginning of the new starting block.

Quite often the operator is able to observe the flameout before a new block of data is read from the tape reader. In these cases, it would be desirable to have the operator place the control in a backup mode of operation wherein the control would automatically back up along the commanded path. This backup mode could be terminated by the operator when he observed that the flamecutter has backed up to a position before the flameout occurred or could be automatically terminated if the flamecutter has reached the beginning of the commanded path. The operator would then place the control in the normal mode in which the flamecutter would retrace and complete the commanded flamecutting operation. This would eliminate the manual positioning of the flamecutter and the backing up of the paper tape by the operator.

It is, therefore, a primary object of this invention to provide a numerical contouring control that can back up along the path being commanded by a block of information.

It is another object of this invention to provide a numerical contouring control wherein the operator can interrupt the control and cause the tool to automatically back up along the commanded path to a point not beyond the beginning of the path commanded by the block of information controlling the machine tool.

SUMMARY OF THE INVENTION

In accordance with this invention, a machine tool is provided with a backup and retrace capability wherein the machine tool can back up along the path commanded by the data block presently controlling the machine. When the control is in the backup mode of operation, the counting direction of the X and Y integrand counters of the arc function generator and the direction control signals for the X and Y motion commands are reversed so that the machine tool reverses its direction along the commanded path. The counting direction of the X and Y distance counters is also reversed in the backup mode so that the X and Y distance counters continue to keep track of the X and Y distances from the present commanded position to the end point of the commanded path. The backup mode is manually terminated by the operation or is automatically terminated when the machine tool reaches the beginning of the commanded path. When the machine tool is returned to the normal mode of operation, the machine tool retraces and completes the commanded path.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

Figure 1:
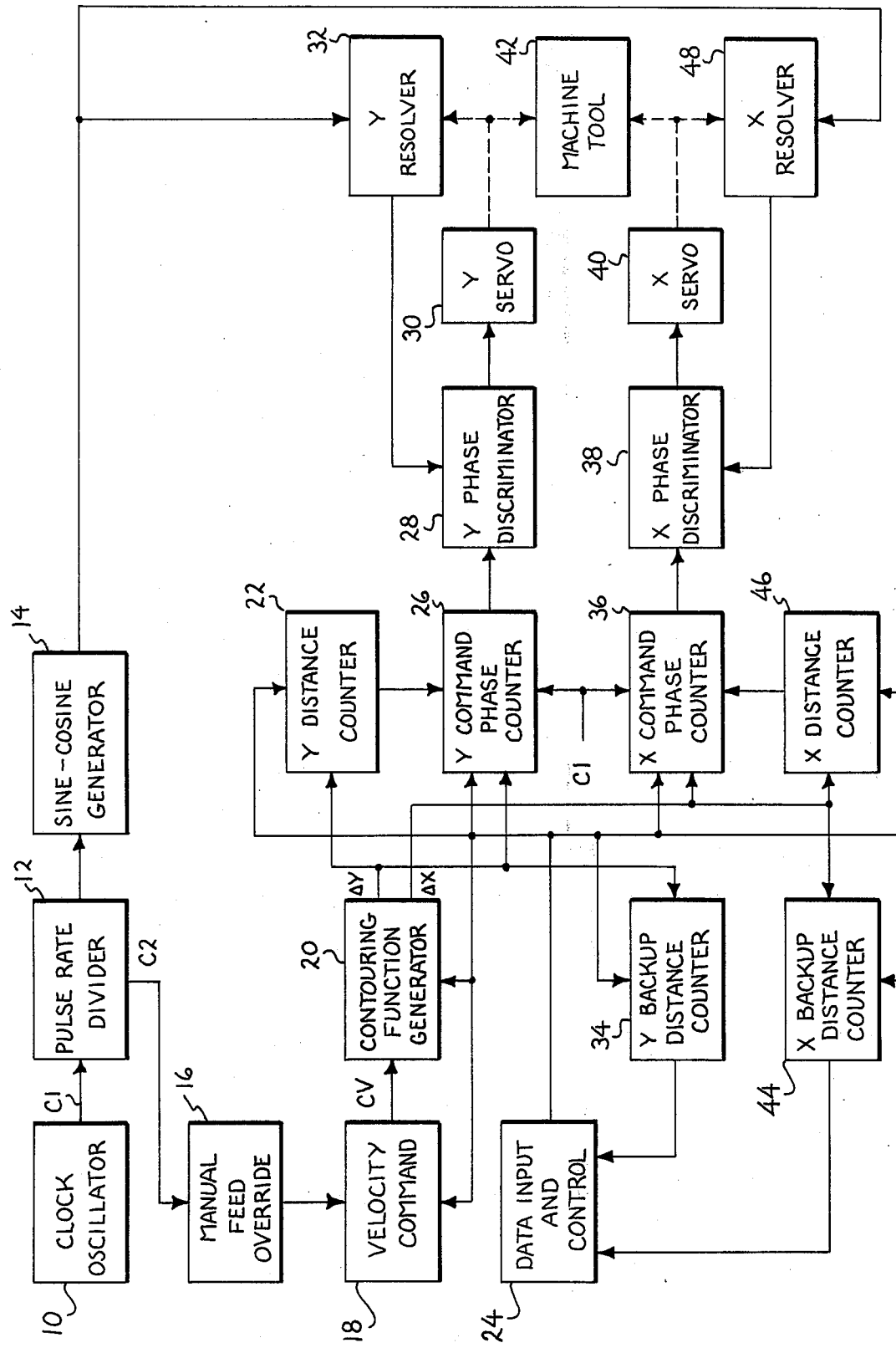
FIG. 1 is a block diagram of a numerical contouring control embodying this invention.

FIG. 1 is a simplified block diagram of a numerical contouring control embodying this invention. The basic numerical contouring control system is known in the art and is described in greater detail in U.S. Pat. No. 3,449,554, issued to L. U. C. Kelling, and assigned to the assignee of this invention.

The system has been assumed to provide an X-axis of motion and a Y-axis of motion, these axes usually being mutually perpendicular, and generally lying in a plane. However, more or less axes of motion may be provided. The combined axes of motion provide the resultant motion. The system is provided with numerical command information from numerical data input equipment in the data input and control block 24. This information may be on a punched tape, a punched card, a magnetic tape, or on some other medium. Typically, this information indicates the desired speed of relative movement of a tool (such as a milling machine cutter) and a workpiece, and the desired direction of the path of relative movement of the tool and workpiece. The numerical data input equipment reads the commanded information and generates appropriate electrical signals for controlling the system and relative movement of the tool and workpiece. The system utilizes pulses or trains of pulses which convey or indicate the commanded information. These pulses are produced by a clock oscillator 10 at a C1 rate. This C1 rate is divided or reduced by a pulse rate divider 12 which produces pulses at various rates including the C2 rate indicated. The pulse rate divider 12 also supplies pulses to a sine and cosine generator 14 which produces sine and cosine signals for use in the servo portion of the system.

Pulses from the pulse rate divider 12 are supplied to a manual feed override 16 which enables an operator to manually control the speed of relative movement. Pulses from the manual feed override 16 are supplied to a velocity command 18 which modifies the incoming pulse rate from the manual feed override 16 by an amount called for by the data input and control unit 24 and provides contouring velocity pulses CV. These contouring velocity pulses CV occur at a rate which indicates the resultant velocity of relative motion of the tool and workpiece.

The contouring velocity pulses CV are supplied to contouring function generator 20 which resolves these pulses into X and Y components of pulses wherein each pulse represents a commanded increment of motion along the X or Y-axis. The pulse output rate will then be representative of the commanded velocity along the axis. These components of pulses are indicated as Δy and Δx and are applied respectively to Y and X distance counters 22, 46, to Y and X back up distance counters 34, 44, and to Y and X command phase counters 26, 36.

Each command phase counter 26, 36 divides the C1 pulse train to generate a signal having a frequency that is substantially equal to the frequency of the signals generated by the sine-cosine generator 14. The difference in phase between the signal generated by the command phase counters 26, 36 and the signals generated by the sine-cosine generator 14 is proportional to the desired position of the machine tool. The command phase counters 26, 36 respond respectively to the Δy and Δx pulses from the function generator 20 and direction of motion information from the data input and control unit 24 to advance or retard the phase of their output signal.

At the start of a motion command the data input and control unit 24 presets the Y and X distance counters 22, 46 with numbers representing the distance to be traveled along the Y and X-axes. Each Δy and Δx pulse from the contouring function generator 20 reduces the number in the respective Y and X distance counters 22, 46 by one count. When the number in the Y and X distance counters 22, 46 is zero, a signal is applied to the proper Y and X command phase counter 26, 46 which prevents any further change in the phase of the signals generated by the command phase counter 26, 36.

The output of the Y and X command phase counters 26, 36 are applied respectively to Y and X phase discriminators 28, 38. The phase discriminators 28, 38 compare the phases of signals from the respective Y and X command phase counters 26, 36 with the phases of signals from the Y and X resolvers 32, 48 and produce control signals which are applied to Y and X servos 30, 40. These servos 30, 40 effect motion of a machine tool 42 in the Y and X direction as indicated by the dashed lines. These Y and X servos 30, 40 also move or operate the Y and X resolvers 32, 48. As these resolvers 32, 48 move, the respective phases of their output signals shift. As long as a difference in phase exists between the two signals supplied to a phase discriminator, motion is called for. This motion moves the machine tool and the resolvers. If the system is operating properly, no further motion signals are produced after the time that the machine tool reaches its commanded or desired position.

At the start of a motion command, the data input and control unit 24 clears, or places the number zero in the Y and X back up distance counters 34, 44. As the motion is performed each Δy and Δx pulse from the contouring function generator is counted by the respective Y and X back up distance counters 34, 44. Thus, the Y and X back up distance counters 34, 44 keep track of the Y and X distance commanded during the execution of a motion command.

Figure 2:
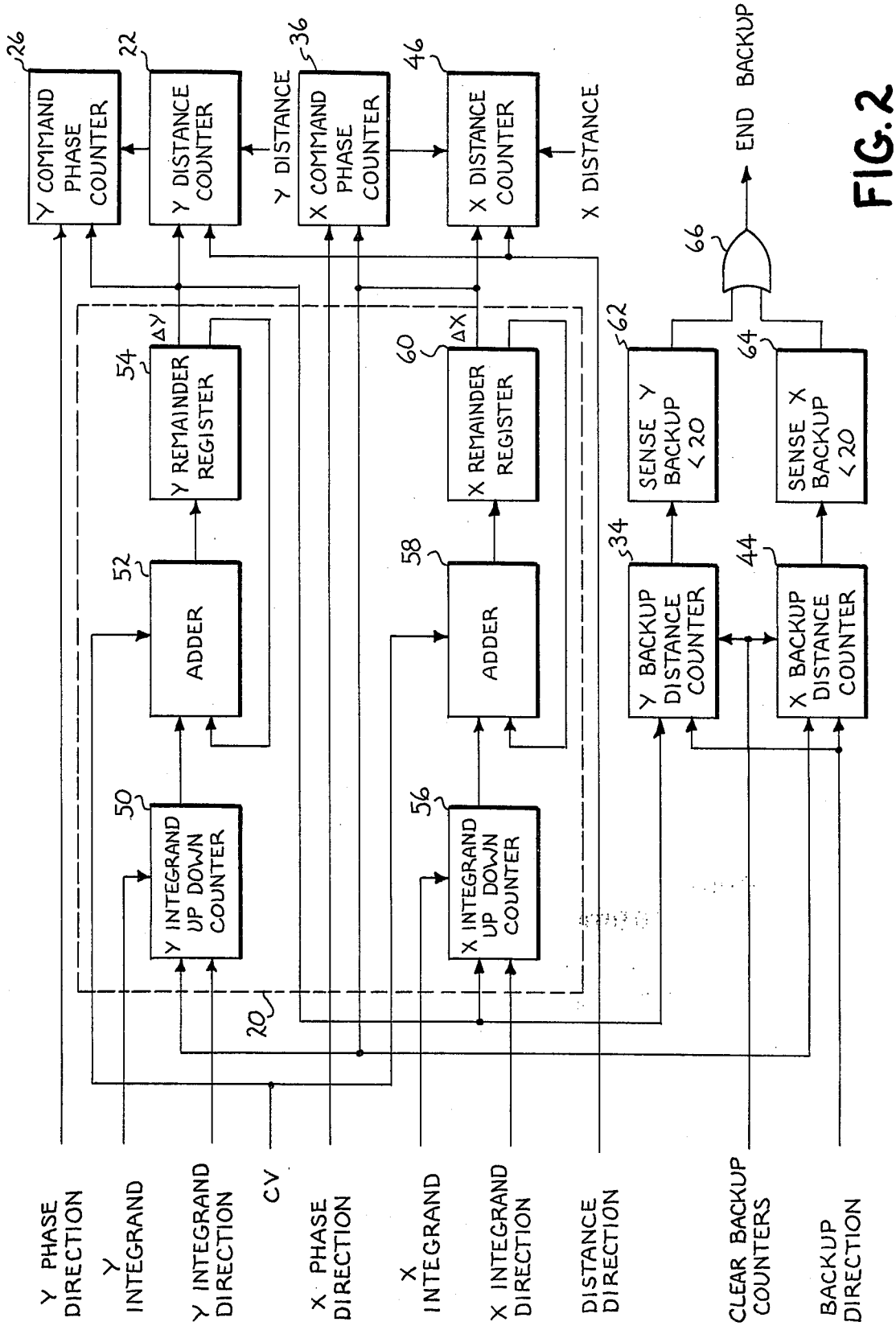
FIG. 2 is an expanded block diagram of certain elements shown in FIG. 1.
Figure 3:
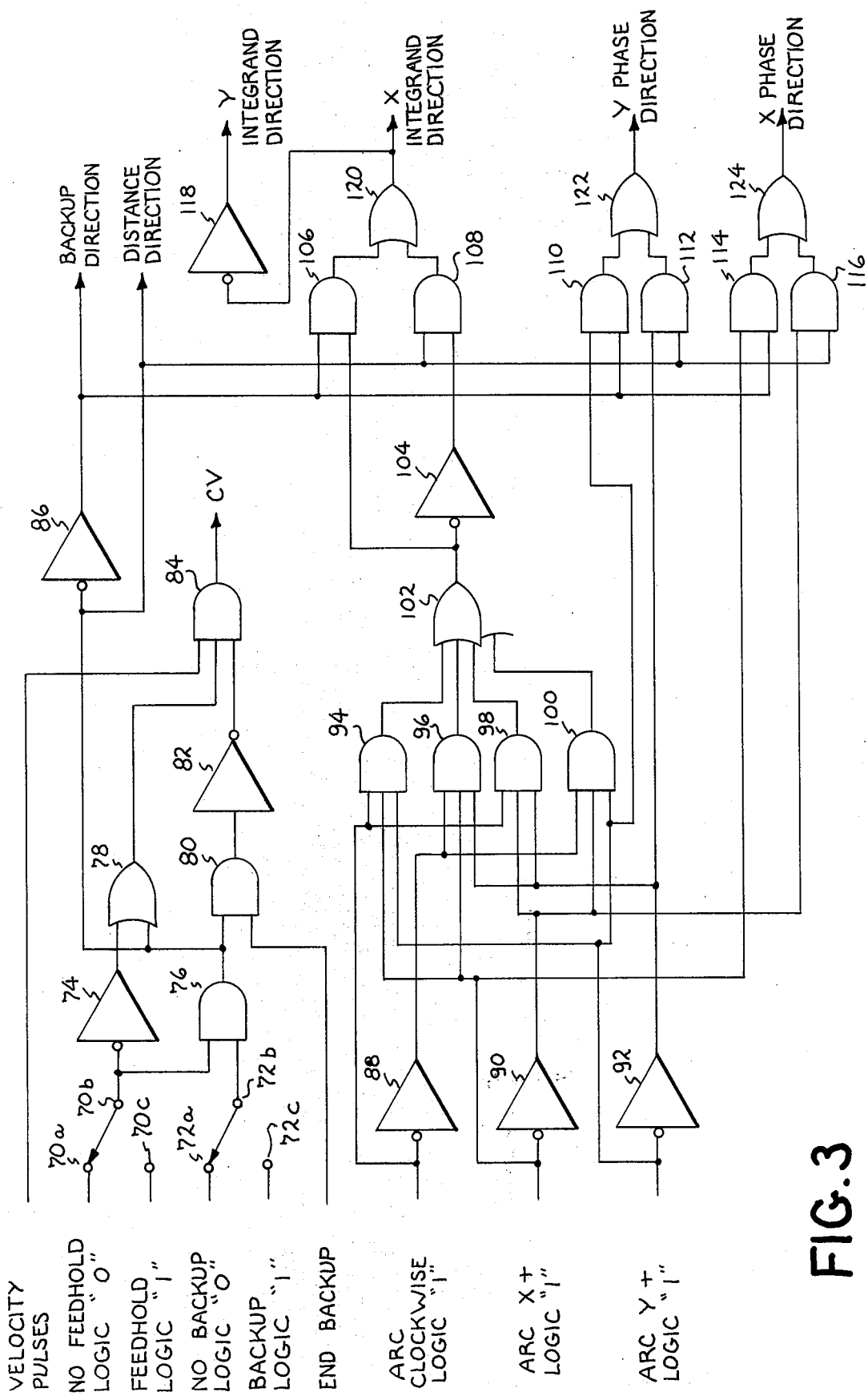
FIG. 3 is a logic diagram of the control circuitry for the elements shown in FIG. 2.

If the data input and control unit 24 senses that the control is in a backup mode of operation, control signals will be applied to the contouring function generator 20, and to the Y and X command phase counters 26, 36 to cause the machine tool 42 to back up along the commanded path. Also in the backup mode the counting direction will be reversed for the Y and X distance counters 22, 46 and for the Y and X backup distance counters 34, 44. The data input and control unit 24 monitors the count in the Y and X backup counters and ends the backup mode if either backup counter 34, 44 is at or very close to zero. This prevents the machine tool 42 from backing up beyond the beginning of the originally commanded path. FIGS. 2 and 3 are combined block and logic diagrams that show in more detail the control functions that are performed in the backup mode. In FIG. 2, the contouring function generator 20 is shown to consist of two digital differential analyzers. However, it will be appreciated by those skilled in the art that other types of function generators can be employed. A detailed discussion of other types of function generators is provided in U.S. Pat. No. 3,674,999, issued to L. U. C. Kelling and assigned to the assignee of this invention. Each digital differential analyzer consists of an integrand up-down counter 50, 56, an adder 52, 58, and a remainder register 54, 60. In preparation for the execution of a motion command, the input data and control unit 24 stores a Y integrand number proportional to the Y component of velocity at the beginning of the arc into the Y integrand counter 50 and stores an X integrand number proportional to the X component of velocity at the beginning of the arc into the X integrand counter 56. Upon the occurrence of a CV pulse, the number in the Y integrand counter will be added to the number in the Y remainder register to generate a new remainder number. If the resultant addition overflows the remainder register, an increment of motion pulse Δy is generated and applied to the Y distance counter 22 and the Y command phase counter 26. In a similar fashion, increment of motion pulses Δx are generated and applied to the X distance counter 46 and the X command phase counter 36. As is well-known in the art, if the Δx increment pulses are used to cause the Y integrand counter 50 to count in one direction and the Δy increment pulses are used to cause the X integrand counter 56 to count in the other direction, the machine tool will travel in a circular arc. Thus, each integrand counter 50, 56 is shown to have an integrand direction control input.

To simplify the design of the function generator 20, a single block of data commands motion in a single quadrant with respect to the center of the arc. If a single curve extends into two or more quadrants, a separate block of data is required for each quadrant of the arc. The X and Y integrand direction control signals for the X and Y integrand counters 50, 56 are determined by the particular quadrant the curve is in and whether the curve represents clockwise motion or counter-clockwise motion. This is explained in greater detail in the above mentioned U.S. Pat. No. 3,674,999.

The Δy and Δx increment pulses are applied respectively to the Y and X command phase counters 26, 36. Each command phase counter 26, 36 has a phase direction control input which causes the command phase counter to either advance or retard the phase of the output signal depending upon the commanded direction of motion.

The Δy and Δx increment pulses are also applied respectively to the Y and X distance counters 22, 46. In preparation for the execution of a motion command, the data input and control unit 24 stores numbers, representing the Y and X distances to be traveled, in the Y and X distance counters 22, 46 respectively. In the normal mode the distance direction control input of the X and Y distance counters 22, 46 will be a logic 0 which causes the Y and X distance counters 22, 46 to countdown one count in response to each respective Δy or Δx increment pulse. When the Y or X distance counter has counted down to zero, it applies a signal to the respective Y or X command phase counter 26, 36 which prevents any further change in the phase of its output signal. In the backup mode it is necessary to reverse the counting direction of the Y and X distance counters 22, 46 so that the Y and X distance counters 22, 46 will continue to keep track of the Y and X distance to be commanded to the end of the desired path. This is accomplished by using updown counters and by making the distance control input to the Y and X distance counters 22, 46 a logic 1 in the backup mode which causes the Y and X distance counters 22, 46 to count up.

In the backup mode of operation, it is necessary to prevent the machine tool 42 from backing up beyond the starting point of the path commanded by the block of data controlling the machine tool. In one embodiment, as depicted in FIG. 2, there is provided a Y backup distance counter 34 and a X backup distance counter 44 which keep track of the distance commanded along the Y and X-axes. In preparing for the execution of a motion command, the data input and control unit 24 clears or places the number zero in the Y and X backup counters 34, 44. While executing a motion command, the backup direction control input to the backup distance counters 34, 44 is a logic 1 enabling the backup distance counters to count upward. Thus, the backup distance counters 34, 44 keep track of the distance commanded from the starting point of the path. When the control is in the backup mode, the backup direction control input of the backup counters 34, 44 will be a logic 0 causing the backup counters 34, 44 to count downward in response to the Δy and Δx increment pulses. Logic circuits 62, 64 sense if the count in either the Y or X backup counter is less than 20. The outputs of the sense logic circuits 62, 64 are OR-ed by OR gate 66 to provide an end backup signal for the data input and control unit 24.

The control logic for the blocks shown in FIG. 2 is illustrated in FIG. 3. In preparation for placing the control in the backup mode, the operator first places the control in the feedhold mode of operation by operating switch 70 so that a logic 1 is applied from contact 70c through pole 70b to the input of inverter 74 and AND gate 76. When a logic 1 is applied to the input of inverter 74, a logic 0 will appear at one input of OR gate 78. Since switch 72 is still in the no backup position, a logic 0 is applied to one input of AND gate 76 through contact 72a and pole 72b, thereby causing a logic 0 to appear at the output of AND gate 76 and at the other input of OR gate 78. Since both inputs to OR gate 78 are a logic 0, the output of OR gate 78 is logic 0. The logic 0 output of OR gate 78, applied to one input of AND gate 84, prevents any velocity pulses from being passed through AND gate 84 to the function generator 20 so that the function generator 20 is unable to generate any more Δy or Δx increment pulses.

To put the control in the backup mode, switch 72 is placed in the backup position which applies a logic 1 to the other input of AND gate 76. Since both inputs of AND gate 76 are at the logic 1 level, the output of AND gate 76 will be a logic 1 and the output of OR gate 78 will be a logic 1. The end backup signal will be logic 0 at this time causing the output of AND gate 80 to be a logic 0 and the output of inverter 82 to be a logic 1. Since the outputs of OR gate 78 and inverter 82 are both logic 1 and are applied to the inputs of AND gate 84, AND gate 84 will allow CV pulses to be generated for the function generator 20 in the backup mode of operation.

The output of AND gate 76 will be a logic 1 when the control is in the backup mode and will be a logic 0 for all other modes of operation. The output of AND gate 76 is used to control the counting direction of Y and X distance counters 22, 46. The output of inverter 86 which is a logic 0 when the control is in the backup mode and a logic 1 for all other modes is used to control the counting direction of the Y and X backup distance counters 34, 44.

Logic gates 88 through 104 control the X and Y integrand counting direction. The data input and control unit 24 determines whether the arc to be generated is clockwise or counterclockwise, and whether the arc is increasing or decreasing in the X and Y directions. Logic gates 94, 96, 98, and 100 select the four conditions which will cause the X integrand counter 56 to be counted upward, OR gate 102 OR's the outputs of AND gates 94, 96, 98, and 100 to provide a logic 1 level when the X integrand is to be normally counted upward while inverter 104, driven by OR gate 102 provides a logic 0 when the X integrand is to be normally counted upward. In the normal mode, AND gate 106 is enabled by the output of inverter 86 and the X integrand counting direction will be determined by the output of OR gate 102 applied through OR gate 120. In the back mode AND gate 108 is enabled by the output of AND gate 76 and the reverse X integrand counting direction will be commanded as determined by the output of inverter 104 as applied through OR gate 120. Since the Y integrand counting direction is always the opposite of the X integrand counting direction, the Y integrand direction control is provided by inverter 118 driven by the output of OR gate 120.

The direction control signals for the Y and X command phase counters 26, 36 are determined by the ARC X+ and ACR Y+ signals generated by the data input and control unit 24. In the normal mode of operation AND gates 112, 116 are disabled while AND gates 110, 114 are enabled by inverter 86 so that the Y and X phase direction control signals are determined by the ARC Y+ and ARC X+ signals applied through OR gates 122 and 124 respectively. In the backup mode AND gates 110, 114 are disabled while AND gates 112, 116 are enabled by the output of AND gate 76 so that the Y and X phase direction control signals are reversed as determined by the outputs of inverters 90, 92.

Figure 4:
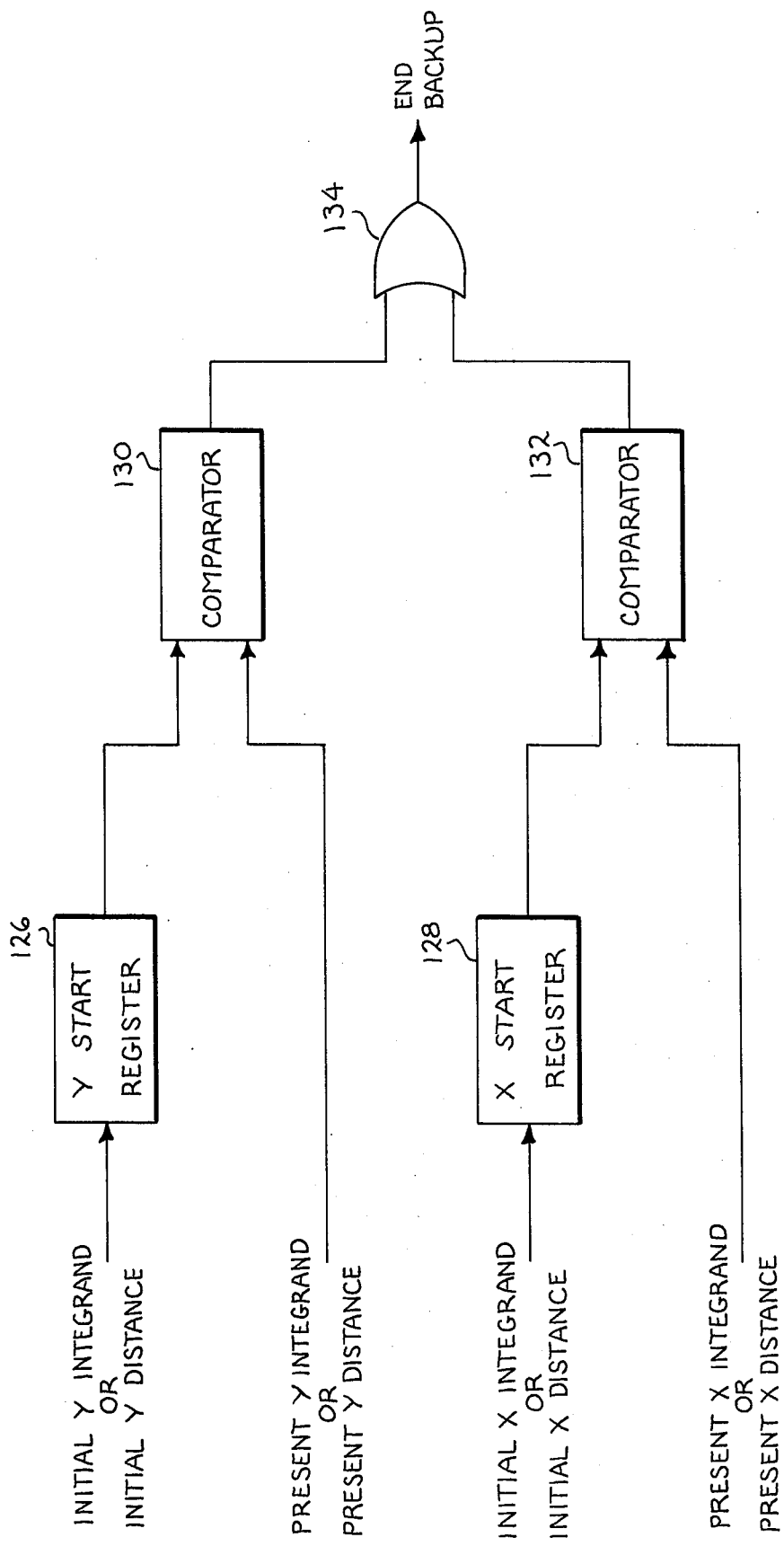
FIG. 4 is a block diagram of an alternate approach for ending the backup mode of operation.

FIG. 4 shows an alternate approach for automatically sensing the end of the backup mode of operation. In one alternate approach, when preparing to execute a motion command, the initial values of the Y and X integrands stored in the Y and X integrand counters 50, 56 are also stored respectively in the Y and X start registers 126, 128. In the backup mode of operation, comparator 130 then compares the initial value of the Y integrand to the number in the Y integrand counter 50 and provides a logic 1 output when the two numbers are the same, or very nearly the same, which indicates that the machine tool 42 is at, or near the Y position at the start of the commanded path. Similarly, comparator 132 provides a logic 1 output when the machine tool 42 is at, or near the X position at the start of the commanded path. The outputs of the two comparators 130, 132 drive OR gate 134 which generates the end backup signal.

In another approach for automatic sensing of the end of the backup mode, the initial values of the Y and X distance numbers stored in Y and X distance counters 22, 46 are also stored in Y and X start registers 126, 128. The comparators 130, 132 then compares the numbers in the Y and X distance counters 22, 46 with the numbers stored in the Y and X start registers 126, 128 and ends the backup mode when either the Y distance number equals, or very nearly equals, the initial Y distance number or when the X distance number equals, or very nearly equals, the initial X distance number.

The operator can also manually terminate the backup mode of operation by placing the backup switch 72 in the no backup position which applies a logic 0 to AND gate 76, which prevents any further CV pulses from being generated by AND gate 84.

While the present invention has been described with reference to a specific embodiment thereof, it will be obvious to those skilled in the art that various changes and modifications may be made without departing from the invention in its broader aspects. For example, although the numerical contouring control has been described as a special purpose computer, it is apparent that the various counters and registers employed could be locations in a memory and that the counting, addition, comparing, and sensing functions can be performed by the instructions or series of instructions in a general purpose computer.

What I claim as new and desire to secure by Letters Patent of the United States is:

1. An improved numerical contouring control of the type having a function generator for generating first and second pulse trains, each pulse representing a commanded increment of motion along a first and second orthogonal axis, said function generator including first and second counters for controlling the rate of generating the pulses, said control also having first and second motor command circuits each responsive to one of said pulse trains and to a direction signal for positioning a machine tool and first and second distance counters for keeping track of the distance to be commanded, along each axis, wherein the improvement comprises:
   a. first backup counter responsive to the first pulse train for counting the commanded distance along one axis;
   b. second backup counter responsive to the second pulse train for counting the commanded distance along the other axis;
   c. control means responsive to a signal indicating that the control is in a backup mode for reversing the motor command direction signals and for reversing the counting direction of the function generator counters, the distance counters and the backup counters; and
   d. logic means for sensing a count in the first and second back up counters and automatically ending the backup mode of operation.

2. An improved numerical contouring control of the type having a function generator for generating first and second pulse trains, each pulse representing a commanded increment of motion along a first and second orthogonal axis, said function generator including first and second counters for controlling the rate of generating the pulses, said control also having first and second motor command circuits each responsive to one of said pulse trains and to a direction signal for positioning a machine tool and first and second distance counters for keeping track of the distance to be commanded along each axis, wherein the improvement comprises:
   a. a first register for storing an initial value of the distance to be commanded along one axis;
   b. a second register for storing an initial value of the distance to be commanded along the other axis;
   c. control means responsive to a signal indicating that the control is in a backup mode for reversing the motor command direction signals and for reversing the counting direction of the function generator counters and the distance counters; and
   d. logic means for automatically ending the backup mode of operation when the difference between the number in the first distance counter and the number in the first register equals a predetermined number or when the difference between the number in the second distance counter and the number in the second register equals said predetermined number.

3. An improved numerical contouring control of the type having a function generator for generating first and second pulse trains, each pulse representing a commanded increment of motion along a first and second orthogonal axis, said function generator including first and second counters for controlling the rate of generating the pulses, said control also having first and second motor command circuits each responsive to one of said pulse trains and to a direction signal for positioning a machine tool and first and second distance counters for keeping track of the distance to be commanded, along each axis, wherein the improvement comprises:
   a. a first register for storing the initial value of the first counter in the function generator;
   b. a second register for storing the initial value of the second counter in the function generator;
   c. control means responsive to a signal indicating that the control is in a backup mode for reversing the motor command direction signals and for reversing the counting direction of the function generator counters and the distance counters; and
   d. logic means for automatically ending the backup mode of operation when the difference between the number in the function generator first counter and the number in the first register equals a predetermined number or when the difference between the number in the function generator second counter and the number in the second register equals said predetermined number.

* * * * *